(No Model.)
F. H. BOLTE.
VELOCIPEDE.
No. 558,928. Patented Apr. 28, 1896.
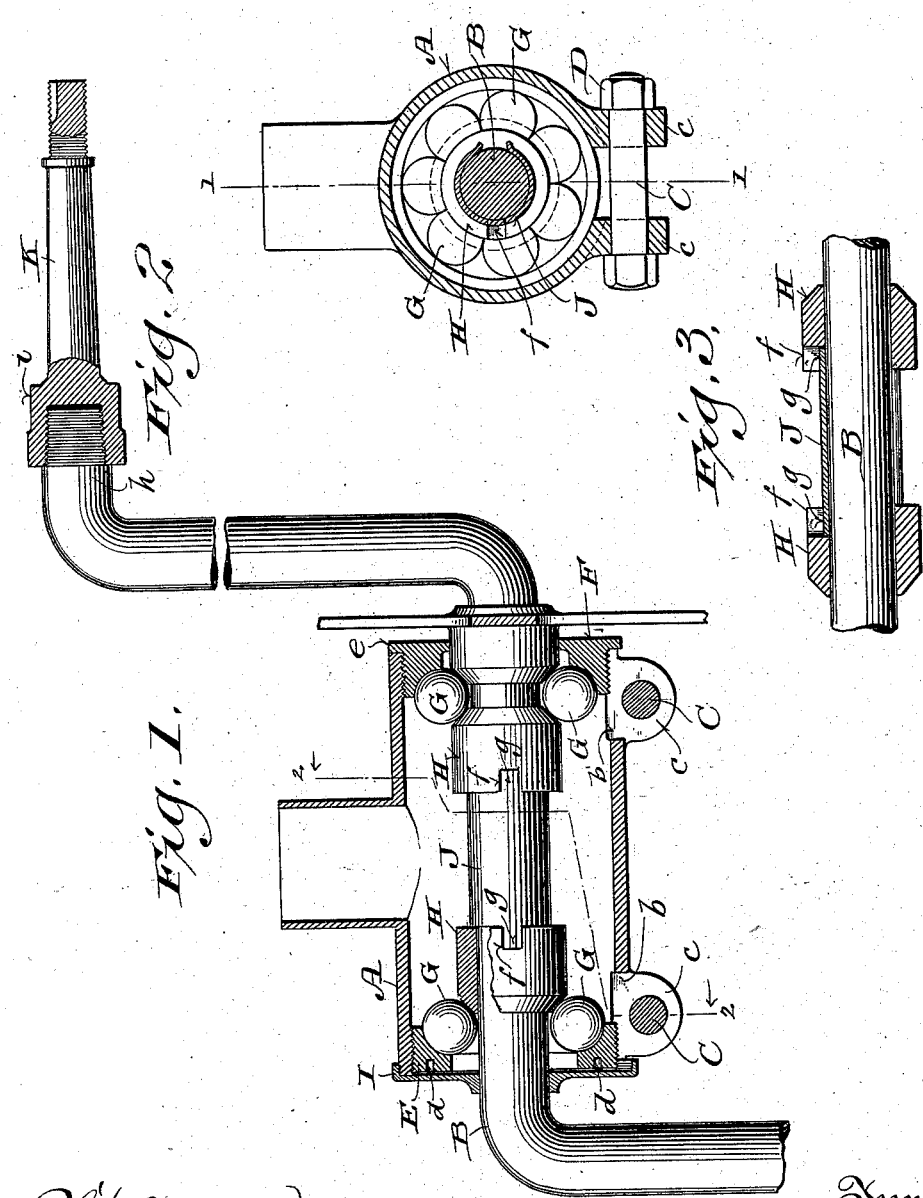
Witnesses:
Geo. W. Irving,
N. E. Oliphant
Inventor:
Frank H. Bolte
By H. G. Underwood
Attorney

UNITED STATES PATENT OFFICE.

FRANK H. BOLTE, OF MILWAUKEE, WISCONSIN, ASSIGNOR, BY MESNE ASSIGNMENTS, TO THE BOLTE CYCLE MANUFACTURING COMPANY, OF SAME PLACE.

VELOCIPEDE.

SPECIFICATION forming part of Letters Patent No. 558,928, dated April 28, 1896.

Application filed April 8, 1895. Serial No. 544,936. (No model.)

*To all whom it may concern:*

Be it known that I, FRANK H. BOLTE, a citizen of the United States, and a resident of Milwaukee, in the county of Milwaukee and State of Wisconsin, have invented certain new and useful Improvements in Velocipedes; and I do hereby declare that the following is a full, clear, and exact description thereof.

My invention has for its object to simplify and strengthen bicycles or analogous vehicles, as well as to cheapen their manufacture, reduce weight, and lessen friction, the said invention consisting in certain peculiarities of construction and combination of parts hereinafter set forth with reference to the accompanying drawings, and subsequently claimed.

In the drawings, Figure 1 represents my improvements as viewed in part on the plane indicated by line 1 1 in Fig. 2; Fig. 2, a transverse sectional view taken on line 2 2 of Fig. 1, and Fig. 3 a detail partly-sectional view illustrating the connection between a pair of antifriction-cones and a spacing-sleeve on a driving-crank.

Referring by letter to the drawings, A represents a tubular hanger for the driving-crank B of a bicycle or analogous vehicle, this crank-hanger being provided with end recesses $b$ of suitable width and depth. Flanking the recesses are depending ears $c$ for the engagement of bolts C, that have clamping-nuts D run thereon. Both ends of the crank-hangers are tapped to engage screw-threaded bearing-rings E F for antifriction-balls G, that also bear on cones H, arranged on the driving-crank.

The bearing-ring E clears the adjacent end of the crank-hanger and is provided with recess $d$ for the engagement of a suitable adjusting-tool. A cap I is loosely arranged on the driving-crank to be slipped onto the hanger so as to exclude dust from the latter. The other bearing-ring F fits snug on the hub of a sprocket-wheel or attaching-plate for the same, made fast to the driving-crank, and a flange $e$ on the latter bearing-ring comes in opposition to the adjacent end of the crank-hanger.

The shaft and arms of the driving-crank are made in one piece from a steel rod bent into shape, and the diameter of the rod is preferably the same throughout, it being desirable to avoid all forging or other tool-work having a tendency to disturb or change the molecules of the steel and thereby weaken the crank.

A spacing-sleeve J is brazed or otherwise rigidly secured to the crank intermediate of the cones H, and this sleeve may be split, as herein shown, to facilitate the placing of the same in position, or it may be otherwise than split and slipped onto said crank preliminary to the bending operation that takes place to form one or both arms of the same.

It will be understood that the cones H are positioned prior to the bending of one or both crank-arms, and I have shown the inner ends of both cones provided with vertical mortises $f$, that engage tenons $g$, projecting from the spacing-sleeve J; but it is practical to have the mortises in the sleeve and the tenons on the cones. The sleeve is employed because it is not desirable to do tool-work on the crank, otherwise various means might be employed to insure the cones turning with the crank.

The recesses $b$ in the ends of the hanger permit the necessary manipulation of the crank to place the same in said hanger or to withdraw it therefrom, and all of the parts being assembled the clamping-nuts D are run in on the bolts to cause a bind of said hanger on the bearing-rings E F, whereby the latter are held against turning.

The antifriction adjustment is effected by manipulation of the bearing-ring E, the latter being positioned after balls G have been seated, and it is to be observed that I am enabled to utilize unusually large balls, whereby I have fewer points of contact, and consequently less friction.

The extremities $h$ of the crank may be turned outward at a right angle to the arms and screw-threaded to engage tapped socket ends $i$ of pedal-pins K, as herein shown.

It is intended that the crank-hanger shall be as dust-proof as possible, and therefore in practice any suitable means may be employed to close that portion of each recess $b$ not stopped by a bearing-ring.

Having thus described my invention, what

I claim as new, and desire to secure by Letters Patent, is—

1. The combination of a tubular hanger having end recesses of suitable area, a one-piece crank provided with a rigid spacing-sleeve, cones on the crank engaging the spacing-sleeve to turn therewith, bearing-rings contained in the hanger, and antifriction-balls intermediate of the cones and bearing-rings.

2. The combination of a tubular hanger having end recesses of suitable area, a one-piece crank provided with a rigid spacing-sleeve having end tenons, cones on the crank provided with mortises engageable with sleeve-tenons, bearing-rings contained in the hanger, and antifriction-balls intermediate of the cones and bearing-rings.

3. The combination of a tubular hanger having end recesses of suitable area and ears flanking the recesses, a one-piece crank provided with a rigid spacing-sleeve, cones on the crank engaging the spacing-sleeve to turn therewith, bearing-rings screw-threaded in the hanger, antifriction-balls intermediate of the cones and bearing-rings, bolts engaging the hanger-ears, and clamping-nuts run on the bolts.

4. The combination of a one-piece crank provided with ball-bearing cones, a tubular hanger for the crank provided with removable ball-bearing rings and end recesses, the latter being of such dimensions as will permit manipulation of said crank to put it in or out of working position; and suitable means for holding said rings in their engagement with the hanger.

In testimony that I claim the foregoing I have hereunto set my hand, at Milwaukee, in the county of Milwaukee and State of Wisconsin, in the presence of two witnesses.

F. H. BOLTE.

Witnesses:
N. E. OLIPHANT,
HENRY DANKERT.